(12) United States Patent
Waite

(10) Patent No.: US 8,635,181 B2
(45) Date of Patent: *Jan. 21, 2014

(54) SYSTEM AND METHOD FOR TAGGING SIGNALS OF INTEREST IN TIME VARIANT DATA

(71) Applicant: AT&T Intellectual Property I, L.P., Reno, NV (US)

(72) Inventor: David Waite, Silver Spring, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,897

(22) Filed: Oct. 16, 2012

(65) Prior Publication Data

US 2013/0041660 A1     Feb. 14, 2013

Related U.S. Application Data

(63) Continuation of application No. 12/582,067, filed on Oct. 20, 2009, now Pat. No. 8,301,578.

(51) Int. Cl.
    *G06F 9/44*           (2006.01)
    *G06N 7/02*           (2006.01)
    *G06N 7/06*           (2006.01)

(52) U.S. Cl.
    USPC ................................................ 706/52

(58) Field of Classification Search
    USPC ................................................ 706/52
    See application file for complete search history.

(56) References Cited

U.S. PATENT DOCUMENTS

| | | | |
|---|---|---|---|
| 6,850,735 B2 | 2/2005 | Sugar et al. | |
| 7,035,593 B2 | 4/2006 | Miller et al. | |
| 7,116,943 B2 | 10/2006 | Sugar et al. | |
| 7,171,161 B2 | 1/2007 | Miller | |
| 7,349,727 B2 | 3/2008 | Obata et al. | |
| 7,978,654 B2 | 7/2011 | Uemura et al. | |
| 8,000,294 B2 | 8/2011 | Uemura et al. | |
| 8,024,279 B2 | 9/2011 | Ryhanen et al. | |
| 8,301,578 B2 * | 10/2012 | Waite | 706/52 |

* cited by examiner

*Primary Examiner* — Michael B Holmes

(57) ABSTRACT

Disclosed herein are systems, computer-implemented methods, and computer-readable storage media for tagging a known signal of interest. Initially, the system classifies the data from an input signal using a short-term classifier, wherein there are at least two classifications available, a first classification of the data as having no identified outputs and a second classification of the data as at least one potential signal of interest, wherein the short-term classifier also bypasses data that is known to be of no interest. After the short-term classifier classifies the inputs, it collapses the input data that is classified as having no identified outputs. This allows the short-term classifier to create time-variant data. Finally, the system will tag a known signal of interest in the time-variant data that was classified as having at least one potential signal of interest. Therefore, a system for tagging a known signal of interest is described.

20 Claims, 3 Drawing Sheets

SYSTEM AND METHOD FOR TAGGING SIGNALS OF INTEREST IN TIME VARIANT DATA

PRIORITY INFORMATION

The present application is a continuation of U.S. patent application Ser. No. 12/582,067, filed Oct. 20, 2009, the contents of which is incorporated herein in its entirety.

BACKGROUND

1. Technical Field

The present disclosure relates to tagging signals and more specifically to tagging voice signals of interest in time variant data.

2. Introduction

Currently, there are a number of different models that are used to identify a signal of interest from a set of data. Typically, an analysis tool analyzes the output of a signal classifier over a period of time until the tool has enough information to identify a signal of interest. There are several well known forms of analysis that presently perform this function. Some examples are moving averages, least squares, convolution, and the Savitzky-Golay smoothing filter. However, these methods provide smoothing of the signal with respect to a measured change in time. Using time difference as a basis for smoothing has some consequences, including the fact that when the signal is interrupted, the interruption can cause disruption in the system resulting in reduced smoothing values. These systems have further problems including the inability to properly identify signals of interest when there are multiple signals available and only one is of interest. Also, these approaches generally require pre-segmented data and multiple passes over the data to generate an accurate identification.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, computer-implemented methods, and computer-readable storage media for tagging signals of interest in time-variant data. Regarding the computer-implemented method, initially, a computer based system like that shown in FIG. 1, converts a time domain input signal into the frequency domain so that features can be extracted from the input signal. A classifier then identifies a classification for the input a signal based on the features extracted therefrom. The classifier can classify the input signal into multiple classifications including a category where the input has no identified outputs or a category where the input signal has a potential signal of interest. Further, the classifier can bypass data that it knows is of no interest to the system. The classifier can also create time-variant data by collapsing portions of the input data that are classified as having no identified output. Then the classifier outputs that time-variant data to a signal tagger, which tags a signal known to be of interest to the system.

Further, another embodiment presently disclosed involves a system that can perform the method, such as is shown in FIG. 1 or can be represented by other appropriately designed hardware configurations. Included in this system embodiment would be a processor that is in communication with a classifier, where the classifier can control the processor, thereby allowing the classifier to accept an input and classify it into an appropriate category. Here, once again, the categories can be no identifier outputs or an output containing a potential signal of interest, while the processor is also able to ignore signals known to be of no interest to the system. The classifier can then instruct the processor to collapse portions of the input signal that have no identified output, creating time-variant data. Then a signal tagger controls the processor to tag a signal known to be of interest to the system.

A final embodiment is a computer program that is stored on a computer readable medium that has instructions for controlling the computer. The instructions control the system and tell the system to use a classifier to classify data from an input signal into an appropriate category. Specifically, the classifier classifies the signal as either having a potential signal of interest or having no recognized output. Further the instructions would instruct the classifier to ignore signals known to be of no interest to the system. Next the instructions control the classifier to form time-variant data by collapsing those portions of the input that have no recognized output. Finally, the instructions control a signal tagger to tag any known signals of interest from the time-variant data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
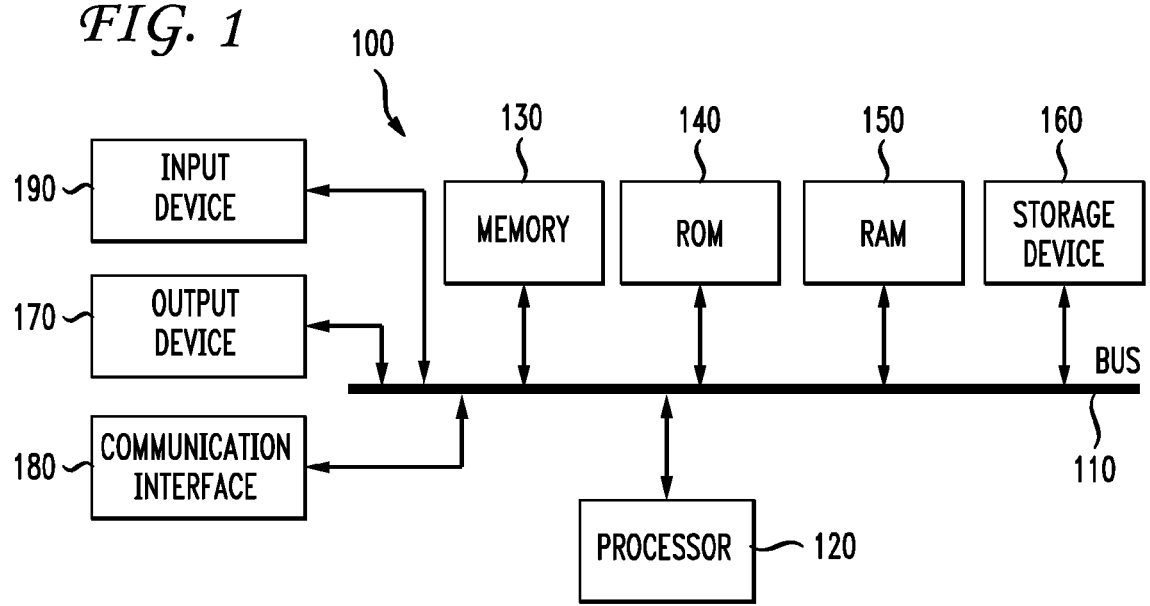
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. Signals per se are a form of transmission media through which the software components stored in a computer-readable storage medium may be transmitted. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor, digital signal processor (DSP), field programmable gate arrays (FPGAs), and/or application specific integrated circuits (ASICs) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
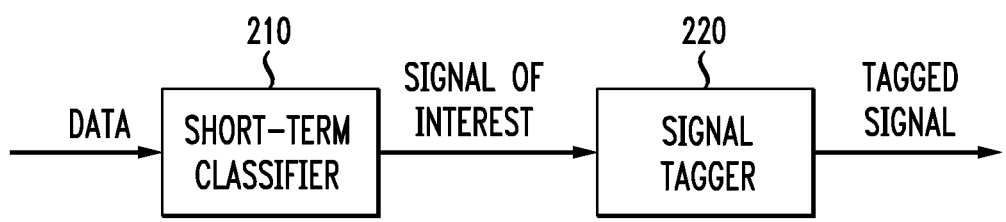
FIG. 2 illustrates a general embodiment of a computing device that conforms to the present disclosure.

Having disclosed some basic system components, the disclosure now turns to the exemplary method embodiment shown in FIG. 2. For the sake of clarity, the method is discussed in terms of an exemplary system such as is shown in FIG. 1 configured to practice the method.

FIG. 2 illustrates a first embodiment classifier that classifies input data using the short-term classifier 210 to narrow the input data to a potential signal of interest, and then uses the signal tagger 220 to identify and tag the potential signal of interest. As an initial example, the input data can be audio signals and the short-term classifier 210 and the signal tagger 220 can be used to identify the speaker of the audio signal. When the signal of interest is a voice, the system converts the time domain audio sample to a sequence of frequency domain vectors. This transformation can take place in a number of different ways using mathematical transformation operations like Laplace and Fourier transforms. From these frequency domain vectors, the system extracts features to allow for pattern classification. Such features can include Mel-frequency cepstral coefficients (MFCC), first and second derivatives of MFCCs, prosody including aspects of formants and pitch, and induced higher order features such as Principal Component Analysis (PCA), however, a person of skill in the art will be familiar with multiple other features that can be extracted.

Frequently, when voices are the signal of interest, there will be a database of known voices representing the person or persons that are of interest. This database can be a separate module within the system; however, it is presently represented as being part of the short-term classifier 210. Further, the database can be used to train the short-term classifier 210 to recognize when a person of interest's voice is within the original audio sample. This allows the audio sample to be an input into the trained short-term classifier 210, where the short-term classifier outputs values that indicate there is a signal of interest within the audio sample. These values are stepped over time and may fluctuate depending on the changing nature of the input data. Then, a signal tagger 220 analyzes these outputs to find and identify candidate signals of interest in real-time without the need to analyze the data using multiple passes.

In one aspect, the signal tagger 220 analyzes the short-term classifier's output and computes smoothed results. Initially, the signal tagger 220 will determine the number of matches (hits) identified within the short-term classifier outputs, where the outputs are based on the short-term classifier input vectors. When a trained speaker's voice is identified as present, the output values will be "1", otherwise the value will be "0". Depending on the classifier, the system can determine these output values by a decision method such as a threshold.

The signal tagger 220 then sums the hits for each output over a frame of data where the frame size is determined by the number of hits for the most likely candidate signal of interest. In one embodiment, this frame size is defined as when a total of 2 seconds of hits (an adjustable parameter) have been collected for the most likely candidate from the short-term classifier. The most likely candidate is evaluated every 0.5 seconds. However, a person of skill in art, with the use of the present disclosure, will be able to determine the ideal frame size, based on the signals being analyzed. In one aspect, a system practicing the method can learn the optimal period for a speaker specific model. The system can base the learning on a signal profile, a history, and/or other related parameters. The short-term classifier 210 can also label its outputs. For purposes of example, and in no way meant to be limiting, the present embodiment will use three primary categories when analyzing inputs for speaker recognition. The three categories are: one output, multiple outputs, and no outputs. The one output category is used when the short-term classifier 210 outputs a single signal of interest; it can be beneficial to have the short-term classifier 210 focus on one output for each input vector. The multiple outputs category is used where there are multiple signals present, such as two different voice conversations in the same environment. Finally, the no outputs category is used when no outputs for the classifier are true, for instance when the classifier encounters a signal that it has never seen before.

For the "one output" category, there are some instances where more than one output could occur. The first of a non-limiting group includes when there is more than one speaker of interest talking at the same time. A second example is when there are different noises present that cause the short-term classifier 210 to interpret a new signal that is not identified to appear as though it satisfies the trained conditions. Therefore, one of the advantages of using the one output category is to sum only the classifier outputs where one signal is identified, thereby allowing for the rejection of weak conditions where the score would be biased because of the two signals being seen as active. So, the signal tagger 220 waits until there is only one signal of interest present and thereby excludes some of the cases that can cause the signal tagger to miss-identify a signal.

To further explain the multiple outputs category, it is possible for the short-term classifier 210 to identify more than one signal of interest in the input data. For instance if there is a conversation between four persons of interest, then the short-term classifier would output four signals of interest to the signal tagger 220. This would allow the signal tagger 220 to switch between the four persons in the conversation as each talked in real time.

The disclosure next further explains the "no output" category and how it is used. In one example, the short-term classifier 210 encounters a signal that it has never seen before. During these periods where the signal cannot be classified, the short-term classifier 210 can ignore or collapse these periods of time to create a time-variant structure or data streams. This time-variant data is then analyzed by the signal tagger 220 and smoothed. A further aspect of the no output category is that when a period of no output is observed for a significant amount of time, the signal tagger 220 can then tag that signal as a potential signal of interest and add it to the database of known signals, even though the source is still unknown. This potential signal of interest is then available for use in analyzing future data for tagging.

Collapsing can take place using multiple techniques, of which a non-limiting group of examples will be described. One method of collapsing is where the data is actually removed from the stream by the short-term classifier 210, resulting in an output where the frame only accepts data that is allowed through the short term classifier and thereby collecting 2 seconds of data, per the above example. Another technique involves ignoring the data during the periods of no output, thereby functionally collapsing that period without actually removing the data. This will cause the smoothing window of 2 seconds, per the above example, to grow as needed since the ignored portions do not count or contribute to the data used in the smoothing process.

The classifier can be trained to recognize the background ambient noise floor and unwanted non-speech sounds such as door slams, paper rattle, air conditioning equipment, overhead airplanes, dial tones, etc. The system can group such non-speech sounds into a non-speech category which is collapsible if no speaker of interest classifier output signals are present. Some sounds are not clearly "non-speech", such as a cough or a speaker clearing his throat. The system can decide whether to include such borderline sounds with the speaker of interest signal because the sounds are characteristic of the subject speaker.

One of the consequences of having signals of no interest is that when only signals of no interest are present and the short-term classifier 210 ignores those signals, that period of time will be considered to have no output and collapsed as if the short-term classifier has no output. A similar situation will occur when both signals of no interest and signals that fit into the no output category are present, because the short-term classifier 210 will bypass the signals of no interest and collapse the no output signals, thereby effectively collapsing the signals of no interest as well. When the signal of no interest is present along with a signal of interest, then the signal of no interest is bypassed and ignored to reduce the noise in the signal and provide for a more effective tagging. Some non-limiting examples of signals of no interest are system background noise, paper rattles, thumps, or even known speakers of no interest. Those of skill in the art will be able to further distinguish sounds that are of interest and those of no interest. A helpful addition to the database can be known signals of no interest so that the classifier can easily exclude those known sounds that are not of use in tagging signals of interest.

Next, in accumulating the running hit totals, the classifier can begin to compute scores and separation values for these totals. In one exemplary embodiment, the running hit totals are given by the following equation:

$$\text{Score}(x) = 100 * \sin\left(\frac{\sum_{i=1}^{n} hits_{xi}}{totalhits - bghits} * 90\right)$$

where:
x=index representing the particular signal of interest; individual scores are computed for each classifier signal of interest
n=the number of evaluated input vectors for a smoothing period—where the length of the smoothing period is dependent on the amount of data collected for the best candidate
hits=the selected classifier output result (1 or 0) for true/false for a classifier input vector
i=the input vector index for the selected time period
totalhits=the accumulated sum of all classifier outputs over the selected time period
bghits=hits for anything identified as "signal of no interest" (such as system background noise, paper rattles, thumps, and even other known speakers not of interest).
Note: the sin( )function is optional; it provides a human-factors adjustment to skew the scores into a higher range of values. Relative position of the scores remain unchanged without the function. The constant "90" scales the hits ratio to 0-90 degrees for the sin( )function. Therefore, the above equation can be simplified to:

$$\text{Score}(x) = \frac{\sum_{i=1}^{n} hits_{xi}}{totalhits - bghits}$$

These scores are then used to determine which outputs from the classifier have the highest likelihood of being the signal of interest. To make this determination, the system looks at the signal that has the highest score over the selected period. Next, the signal with the highest score is monitored over multiple selected frames, allowing the total score to increase in a short-term smoothing function. Another aspect of this embodiment is that there are cases where the signal with the highest score can change between the selected periods. When this occurs, the amount of time needed to accumulate data adapts to a period needed for the most likely signal of interest as does the time until the smoothing function is observed. Therefore, the system utilizes as much time as is necessary to accumulate sufficient amounts of data to properly tag a signal of interest. This means that in the present embodiment, the signal tagger tags results that are based on the classifier data, independent of the period. The best candidate for the signal of interest and the associated amount of time for the signal tagger accumulator is recalculated at each selected period of time, and a smoothed signal tagger output is computed for each classifier category.

Another calculation that may help in identifying the signal of interest is the separation between the most likely candidate for being the signal of interest and the second most likely candidate for signal of interest.

$$\text{separation} = \frac{(n1 - n2)}{(n1 + n2)} * 100$$

Where,
n1=score for the most likely candidate
n2=score for the 2nd most likely candidate It turns out that the separation and the score are highly correlated, as separation is inherently considered for all classifier categories by the score computation. The separation value can serve the further purpose of helping an analyst who is later reviewing the data to understand where similar signals are showing up and where the classifier is having a difficult time.

If enough non-speech accumulates between speech, then the system implements a shut-off condition, effectively resetting the smoothing functions and disabling the results until enough speech is again encountered. This effectively clamps the outputs of the signal tagger to zero during longer periods of non-speech. The reset condition is based on an adjustable level, m, when $$totalhits \geq m * bghits$$

While the previous embodiment dealt primarily with voice identification, there are many other areas where the method of signal tagging can be used. The uses for the method are very broad—the technology applies to any signal classification problem where dynamic tagging of the occurrence of a signal of interest is needed, non-limiting classifier examples include Gaussian mixture models, Support Vector Machines, neural networks, and learning machine architectures. One such example can be signals intelligence applications, including signal detection, signal identification, targeting, signal channel identification, etc. Areas of value to the Intelligence Community include SIGINT, COMINT, ELINT, and MASINT.

For commercial applications, the signal tagger 220 could be employed to trigger adaptive systems that tune into identified signals in a broad spectrum of capability. For example, automated speech recognition (voice to text) would be enhanced very quickly for a recognized speaker by adapting the speech model to the characteristics of that speaker's voice (or family of voice).

In addition to adaptive systems, the signal tagger 220 could be used in authentication systems to verify the user of a device or for access to areas or equipment. The signal tagger 220 could be used to validate remote employees who are a party to sensitive conference calls.

The signal tagger 220 can also be used in learning machines. For example, if a set of known signals are normally encountered, and a new one shows up, the signal tagger 220 can be used to identify the new signal as one of a class of signals—but unknown. The new signal can be submitted to a classifier for training and be added to the knowledgebase for future encounters. This approach could be used in network fraud and abuse analysis by tagging voice calls and associating the tags in a knowledgebase with other calls for contact chaining and social network analysis.

The short-term classifier 210 system employed with the signal tagger 220 is not limited to voice applications. It can be applied to any sensory stimuli that can be represented by a digital signal. The signal tagger 220 is also not limited to a particular classifier, and could be employed to enhance many existing applications.

Further, this embodiment can be gated to be active or inactive based on the number of samples that are being collected. The measurement of the number of samples can take place using at least two different methods. One such method is to determine the number of samples heuristically based on current or previous results. A second is measuring the sample rate automatically, and adjusting the period by looking at the signal tagger output so that intermittent output switching is minimized or optimized.

Figure 3:
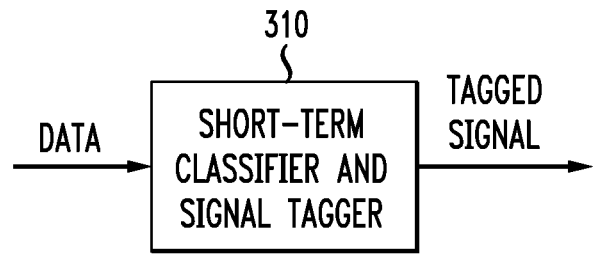
FIG. 3 illustrates a further general embodiment of a computing device that conforms to the present disclosure.

FIG. 3 represents another embodiment within the teachings of the present disclosure. In this embodiment, the signal tagger and short-term classifier are combined into a single module 310 to both classify the input data, and tag a signal of interest all in the same step. This embodiment would therefore not output the signal of interest to the signal tagger but rather would take the classified signal and tag it thereby creating only one output.

Figure 4:
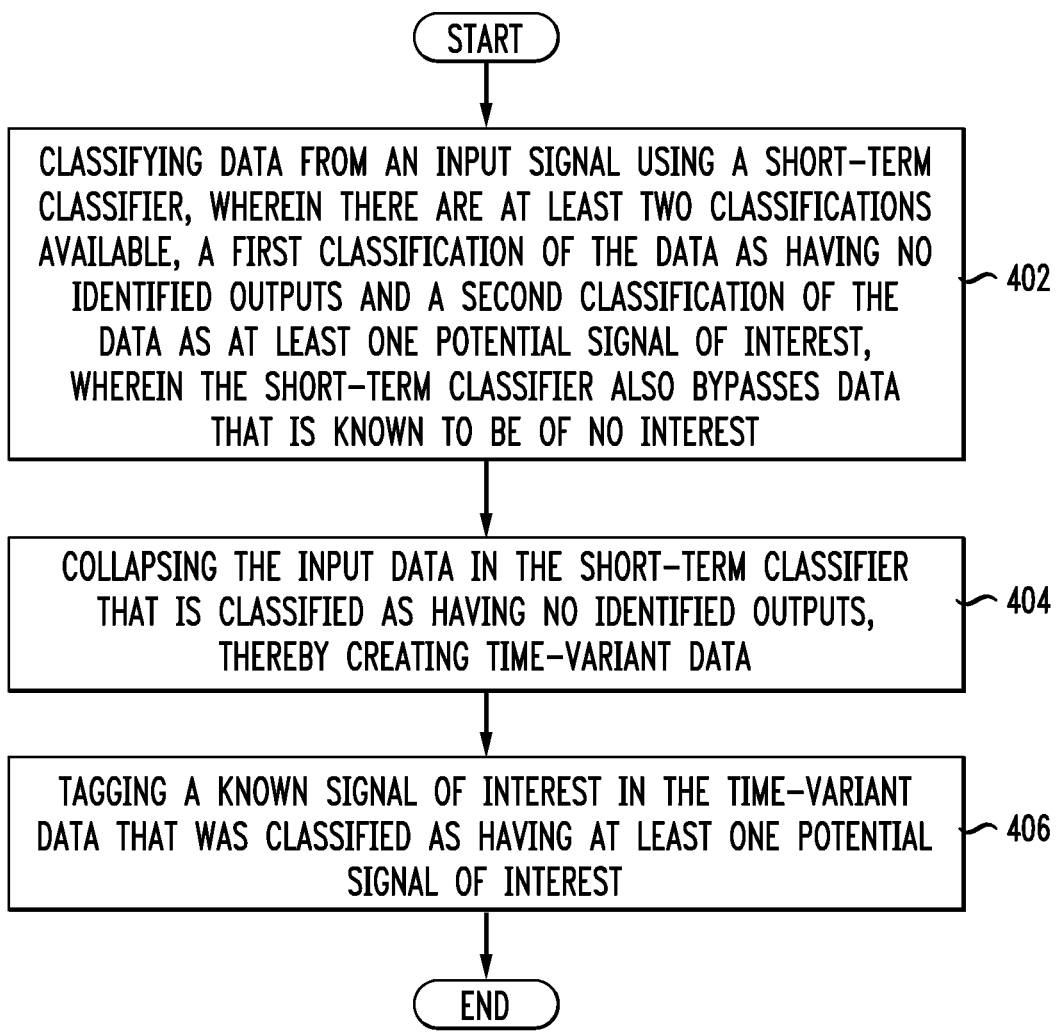
FIG. 4 illustrates an example method embodiment.

FIG. 4 represents the method that is performed or executed by a system or computing device like that shown in FIG. 1 or any other appropriate hardware configuration. As shown in FIG. 4, the system classifies, via a processor, the input signal using the short term classifier, like that shown as 210 in FIG. 2. The classifications include data classified as having no identified outputs and data classified as having a potential signal of interest. Also, the system can bypass data that it knows is of no interest. Then the system can create time-variant data by collapsing the portions of the input signal that are classified as having no identified outputs. Finally, the system will tag a signal of interest using a signal tagger like the one shown as 220 in FIG. 2.

Another embodiment deals with a tangible computer readable storage medium storing a computer program having instructions for controlling a computing device to tag known signals of interest, the instructions causing the computing device to perform the steps just described and shown in FIG. 4. The computer system would be configured using the hardware as shown in FIG. 1 or any other appropriate hardware configuration.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to any signal from radio frequencies to thermal imaging. Those skilled in the art will readily recognize various modifications and changes that may be made to the principles described herein without following the example embodiments and applications illustrated and described herein, and without departing from the spirit and scope of the disclosure.

I claim:

1. A method comprising:
classifying, via a processor, a first data from input signal data as having no signal of interest, to yield a first classification;
classifying a second data from the input signal data as having a potential signal of interest, to yield a second classification;
collapsing a portion of the input signal data, based on the first classification, to yield a third data; and
tagging a segment of the third data, based on the second classification, as having a known signal of interest.

2. The method of claim 1, wherein the collapsing further comprises one of ignoring a portion of the input signal data and removing a portion of the input signal data.

3. The method of claim 1, wherein having no signal of interest comprises one of having no identified outputs and having a known signal of no interest.

4. The method of claim 3, wherein the known signal of no interest comprises one of a door slam, a paper rattle, air conditioning, an airplane engine, a dial tone, and a speaker of no interest.

5. The method of claim 1, wherein the third data is a time-variant data.

6. The method of claim 1, wherein the potential signal of interest is a signal with no output for a predetermined amount of time.

7. The method of claim 1, wherein the third data is smoothed prior to the tagging but after the collapsing.

8. The method of claim 1, wherein the tagging further comprises determining a number of matches identified within the third data based on known signals of interest.

9. A system comprising:
a processor; and
a computer-readable storage device having instructions stored which when executed by the processor, cause the processor to perform operations comprising:

classifying a first data from input signal data as having no signal of interest, to yield a first classification;
classifying a second data from the input signal data as having a potential signal of interest, to yield a second classification;
collapsing a portion of the input signal data, based on the first classification, to yield a third data; and
tagging a segment of the third data, based on the second classification, as having a known signal of interest.

10. The system of claim 9, wherein the collapsing further comprises one of ignoring a portion of the input signal data and removing a portion of the input signal data.

11. The system of claim 9, wherein having no signal of interest comprises one of having no identified outputs and having a known signal of no interest.

12. The system of claim 9, wherein the third data is a time-variant data.

13. The system of claim 9, wherein the third data is smoothed prior to the tagging but after the collapsing.

14. The system of claim 9, wherein the tagging further comprises determining a number of matches identified within the third data based on known signals of interest.

15. A computer-readable storage device having instructions stored which, when executed by a processor, cause the processor to perform operations comprising:
classifying a first data from input signal data as having no signal of interest, to yield a first classification;
classifying a second data from the input signal data as having a potential signal of interest, to yield a second classification;
collapsing a portion of the input signal data, based on the first classification, to yield a third data; and
tagging a segment of the third data, based on the second classification, as having a known signal of interest.

16. The computer-readable storage device of claim 15, wherein the collapsing further comprises one of ignoring a portion of the input signal data and removing a portion of the input signal data.

17. The computer-readable storage device of claim 15, wherein having no signal of interest comprises one of having no identified outputs and having a known signal of no interest.

18. The computer-readable storage device of claim 17, wherein the known signal of no interest comprises one of a door slam, a paper rattle, air conditioning, an airplane engine, a dial tone, and a speaker of no interest.

19. The computer-readable storage device of claim 15, wherein the third data is a time-variant data.

20. The computer-readable storage device of claim 15, wherein the potential signal of interest is a signal with no output for a predetermined amount of time.

* * * * *